(12) United States Patent
Arrasvuori

(10) Patent No.: US 9,425,911 B2
(45) Date of Patent: *Aug. 23, 2016

(54) BROADCAST CHANNEL IDENTIFICATION

(71) Applicant: Core Wireless Licensing S.a.r.l, Luxembourg (LU)

(72) Inventor: Juha Arrasvuori, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,247

(22) Filed: Mar. 10, 2015

(65) Prior Publication Data

US 2015/0180597 A1 Jun. 25, 2015

Related U.S. Application Data

(63) Continuation of application No. 11/455,000, filed on Jun. 16, 2006, now Pat. No. 9,008,598.

(51) Int. Cl.

| | |
|---|---|
| *H04N 21/61* | (2011.01) |
| *H04H 60/37* | (2008.01) |
| *H04H 40/27* | (2008.01) |
| *H04H 60/43* | (2008.01) |
| *H04N 21/438* | (2011.01) |
| *H04N 21/439* | (2011.01) |
| *H04H 40/00* | (2009.01) |
| *H04H 60/44* | (2008.01) |

(52) U.S. Cl.
CPC ............ *H04H 60/37* (2013.01); *H04H 40/00* (2013.01); *H04H 40/27* (2013.01); *H04H 60/43* (2013.01); *H04N 21/439* (2013.01); *H04N 21/4383* (2013.01); *H04N 21/6125* (2013.01); *H04H 60/44* (2013.01)

(58) Field of Classification Search
CPC ... H04H 60/43; H04H 60/44; H04N 21/4383
See application file for complete search history.

(56) References Cited

U.S. PATENT DOCUMENTS

| | | | |
|---|---|---|---|
| 2006/0062363 A1* | 3/2006 | Albrett .................... | 379/101.01 |
| 2006/0245605 A1* | 11/2006 | Matsunaga ................... | 381/123 |
| 2007/0165855 A1* | 7/2007 | Inui .............................. | 380/218 |
| 2008/0059884 A1* | 3/2008 | Ellis et al. .................... | 715/721 |
| 2010/0004026 A1* | 1/2010 | Lee et al. ...................... | 455/566 |
| 2010/0223357 A1* | 9/2010 | Einarsson et al. ............ | 709/219 |
| 2012/0288031 A1* | 11/2012 | Vare et al. .................... | 375/316 |

* cited by examiner

*Primary Examiner* — David Bilodeau
(74) *Attorney, Agent, or Firm* — Core Wireless Licensing, Ltd.

(57) ABSTRACT

An apparatus including a memory for associating at least one user defined channel identifier with at least one selection item of the apparatus and a control unit coupled to the memory, the control unit being configured to cause one of the at least one user defined channel identifier to play when a corresponding one of the at least one selection item is activated by a user.

20 Claims, 8 Drawing Sheets

BROADCAST CHANNEL IDENTIFICATION

CROSS-REFERENCE TO RELATED APPLICATIONS

This application is a continuation of U.S. patent application Ser. No. 11/455,000 filed on 16 Jun. 2006, the disclosure of which is incorporated herein by reference in its entirety.

The present disclosure relates to mobile, television and radio devices (i.e. communication devices) and, more particularly, to communication devices that can receive broadcast transmissions.

BACKGROUND

Mobile devices such as, for example, mobile phones, televisions and radios may provide the ability to receive broadcast transmission such as internet, radio or television broadcasts. While listening to the broadcasts through, for example, a headset or a speaker of the mobile device, a user rarely looks at the mobile device when switching channels or stations from one radio or television broadcast station to another. The controls for switching stations may be located on the cord of the headset so that the user does not interact directly with the mobile device when switching stations. Because the user does not look at the mobile device to determine which station the user is listening to, the user does not immediately know which station is playing on the device.

It would be advantageous to have a mobile device permitting a user to switch stations of the mobile device and immediately know which station is playing without looking for this information on a display of the mobile device.

SUMMARY

In one exemplary embodiment, an apparatus is provided. The apparatus includes a memory for associating at least one user defined channel identifier with at least one selection item of the apparatus and a control unit coupled to the memory, the control unit being configured to cause one of the at least one user defined channel identifier to play when a corresponding one of the at least one selection item is activated by a user.

In one exemplary embodiment, a method is provided. The method includes associating a broadcast reception channel of the device with a broadcast station that can be received by the device, associating an identifier with the broadcast reception channel and mixing the identifier over a broadcast received from the broadcast station on the broadcast reception channel when the broadcast reception channel is activated, the identifier identifying a selected broadcast station to the user.

In another exemplary embodiment, a computer program product is provided. The computer program product includes a computer useable medium having computer readable code means embodied therein for causing a computer to play a channel identifier. The computer readable code means in the computer program product includes computer readable code means for causing a computer to associate at least one user defined channel identifier with at least one selection item and computer readable code means for causing a computer to play one of the at least one user defined channel identifier when a corresponding one of the at least one selection item is activated by a user.

In one exemplary embodiment, an apparatus is provided. The apparatus includes a channel preset unit configured to allow a user to associate at least one broadcast receiving channel of the apparatus with at least one input selection key of the apparatus, a channel identifier unit configured to allow a user to associate an audio identifier with the at least one input selection key and a controller configured to detect an activation of the at least one input selection key for a particular broadcast receiving channel, identify the associated audio identifier associated with the particular broadcast receiving channel, and activate the audio identifier to play over a active signal on the particular broadcast receiving channel.

In another exemplary embodiment, an apparatus is provided. The apparatus includes an associating means for allowing a user to associate at least one broadcast receiving channel of the apparatus with at least one input selection key of the apparatus, a first identifying means for allowing a user to associate an audio identifier with the at least one input selection key, a detecting means for detecting an activation of the input selection key for a particular broadcast receiving channel, a second identifying means for identifying the associated audio identifier associated with the particular broadcast receiving channel and an activation means for activating the audio identifier to play over a active signal on the particular broadcast receiving channel.

In yet another exemplary embodiment, an apparatus is provided. The apparatus includes an associating means for associating at least one user defined channel identifier with at least one selection item of the apparatus and an activation means for causing one of the at least one user defined channel identifier to play when a corresponding one of the at least one selection item is activated by a user.

BRIEF DESCRIPTION OF THE DRAWINGS

The foregoing aspects and other features of the present embodiments are explained in the following description, taken in connection with the accompanying drawings, wherein.

DETAILED DESCRIPTION

Figure 1:
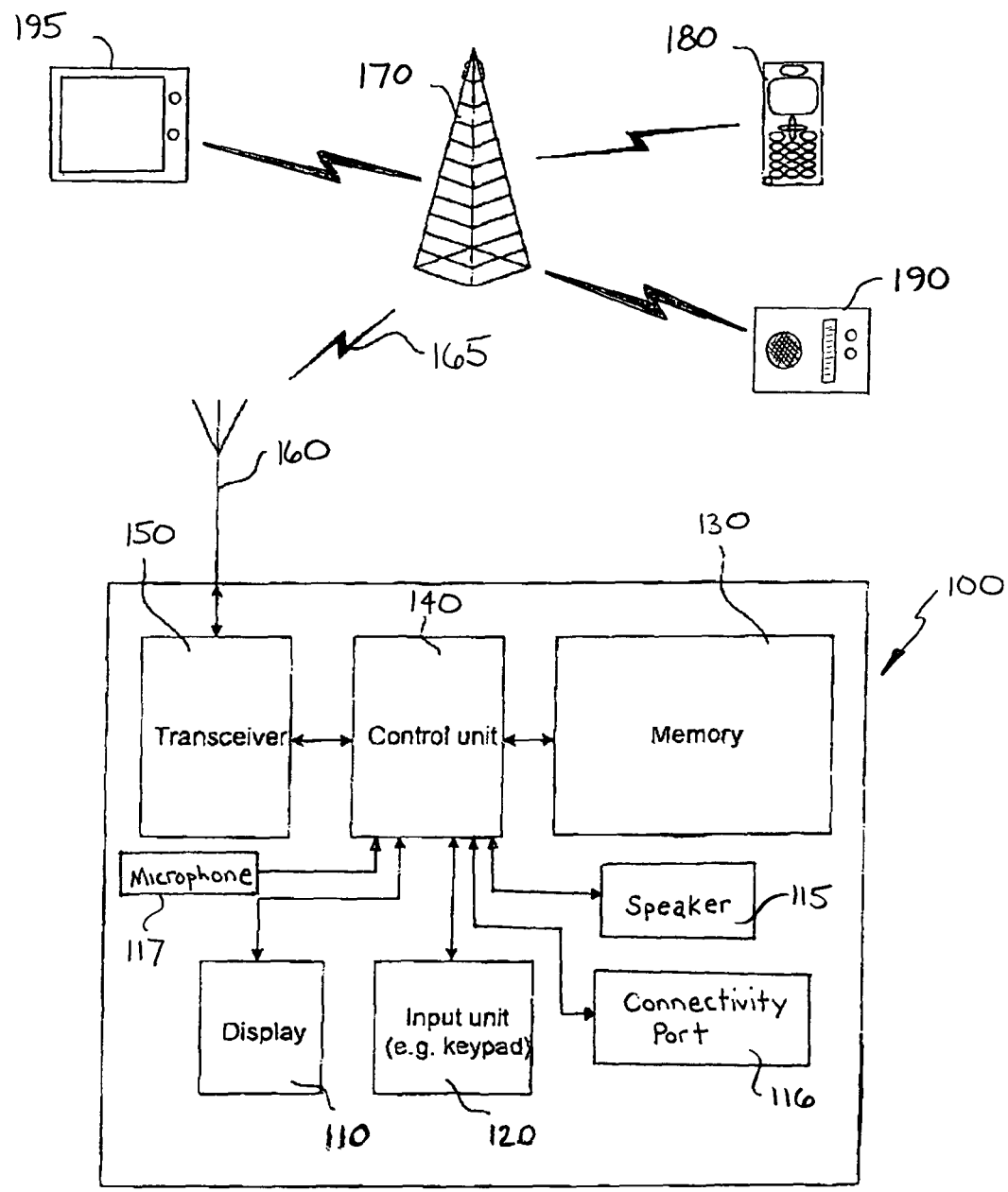
FIG. 1 is a schematic diagram of a mobile device incorporating features of the disclosed embodiments.

FIG. 1 shows a schematic block diagram of a mobile telecommunication terminal 100 according to one embodiment. Although various aspects will be described with reference to the exemplary embodiments shown in the drawings and described below, it should be understood that the aspects could be embodied in many alternate forms of embodiments. In addition, any suitable size, shape or type of elements or materials could be used.

The system and the mobile communication terminal of FIG. 1 are used for ease of illustrating the disclosed embodiments and such illustrations are not intended to limit the aspects of the disclosed embodiments as claimed herein. A mobile device 100 including a transceiver 150 is used for communicating with a base station 170 via an antenna 160.

The base station 170 may be any suitable broadcast station such as, for example, a telecommunication, radio, television or internet broadcast station. The base station 170 may be in communication with other mobile devices 180, portable or stationary televisions 195 or portable or stationary radios 190 via a communications network 165. The communications network may be any suitable communications network such as, for example, a wireless network or a wired network depending on the device receiving the signal. For example, television 195 may receive a data transmission via a wired network through a cable television provider or via a wireless network in the case of satellite or over-the-air digital (high definition) television broadcasts, the radio 190 may receive data over-the-air via radio broadcasts and the mobile devices 180 may receive data over-the-air via a packet switched transmission or the internet. The wireless network may be any suitable network such as, for example, a local area network, a wide area network, a cellular network and the like.

Within mobile device 100, a control unit 140 is coupled to the transceiver 150. The control unit 140 may comprise signal processing circuitry in order to process e.g. voice data and message data (e.g. SMS or MMS) from a user of the mobile device 100 and provide the transceiver 150 with the processed data for transmission to the base station 170. Likewise, the control unit 120 may comprise signal processing circuitry for processing data received from the base station 170 in order to provide the user of the mobile device 100 with e.g. audio, image, video or message data. The control unit 140 may also comprise signal processing circuitry for processing radio or television broadcasts in accordance with, for example, radio or television software algorithms stored in memory 130. The radio broadcasts may be, for example, AM, FM or digital radio signals. The television broadcasts may be, for example, analog signals or digital signals in accordance with any suitable broadcast standard such as for example, the digital video broadcasting-handheld (DVB-H) standard. Alternatively (not shown) some or all of the signal processing functionality may be provided by specialized circuitry in the mobile device 100. The control unit may also be configured for receiving and processing streaming video and/or audio from any suitable source (e.g. service provider) such as, for example, on the internet. The streaming video and/or audio may be, for example, from a podcast or an internet radio or television station.

The control unit 140 may be coupled to a display 110 for providing a user of the mobile terminal 100 with visual data regarding, for example, the radio, television or internet broadcast, a specific call in progress, telecommunication numbers stored in the mobile device 100, signal strength of the wireless communication link 165, messages received from other mobile devices, etc. The display 110 can be of any suitable type and variety. The control unit may also be coupled to a speaker 115 and/or a connectivity port 116. The connectivity port 116 may provide a connection for peripheral devices such as, for example, external speakers or headsets. The speaker 115 and/or the connectivity port 116 may provide a user of the mobile device 100 with audible data regarding, for example, the radio or television broadcast, etc.

The control unit 140 may also be coupled to an input unit 120, which may be in the form of a keyboard/keypad; an on-screen touch-sensitive keyboard; a navigation wheel or joystick for scrolling and selecting items, digits and/or characters shown on the display 110; and a microphone 117 for receiving sound signals such as voice.

Figure 2:
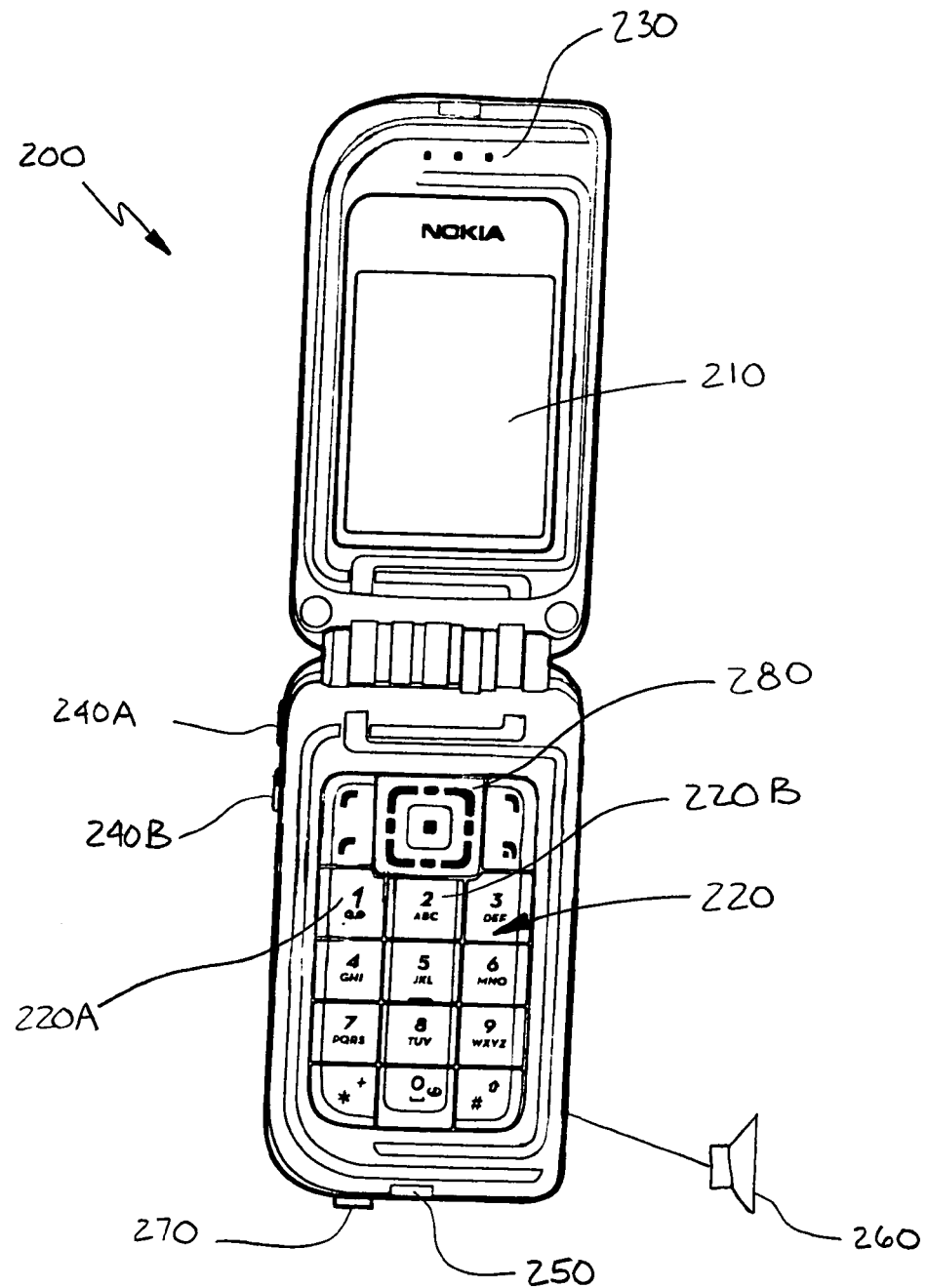
FIG. 2 illustrates a mobile device in accordance with an exemplary embodiment.

In accordance with one embodiment, the device 100, may be for example, the mobile phone 200 illustrated in FIG. 2. The mobile phone 200 may be any suitable mobile phone. The mobile phone 200 may have a display 210, a keypad 220, an ear piece speaker 230, volume keys 240A, 240B, a microphone 250, a loud speaker 260 and a connectivity port 270 for the connection of peripheral devices such as, for example, headsets. In alternate embodiments, the mobile phone 200 may have any suitable configuration.

Figure 3:
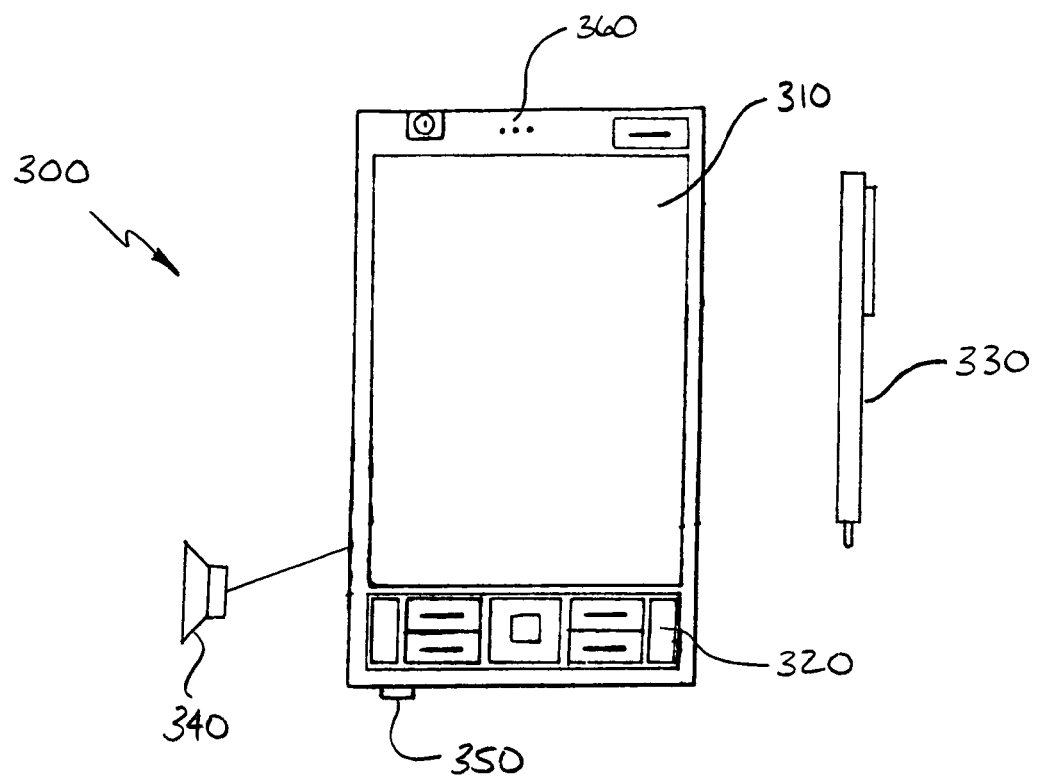
FIG. 3 illustrates another mobile device in accordance with an exemplary embodiment.

In accordance with another embodiment, the device 100 may be any suitable PDA such as PDA 300 illustrated in FIG. 3. The PDA 300 may have a keypad 320, a touch screen display 310, a pointing device 330 for use on the touch screen display 310, a loud speaker 340 and a connectivity port 350 for the connection of peripheral devices. The PDA may also include a microphone 360. In alternate embodiments, the PDA 300 may have any suitable configuration. In still other alternate embodiments, the device 100 may be a personal communicator, a tablet computer, a laptop or desktop computer, a television, a radio or any other suitable device capable of housing the speaker 115 and/or connectivity port 116 and supporting circuitry such as the control unit 140.

Figure 5:
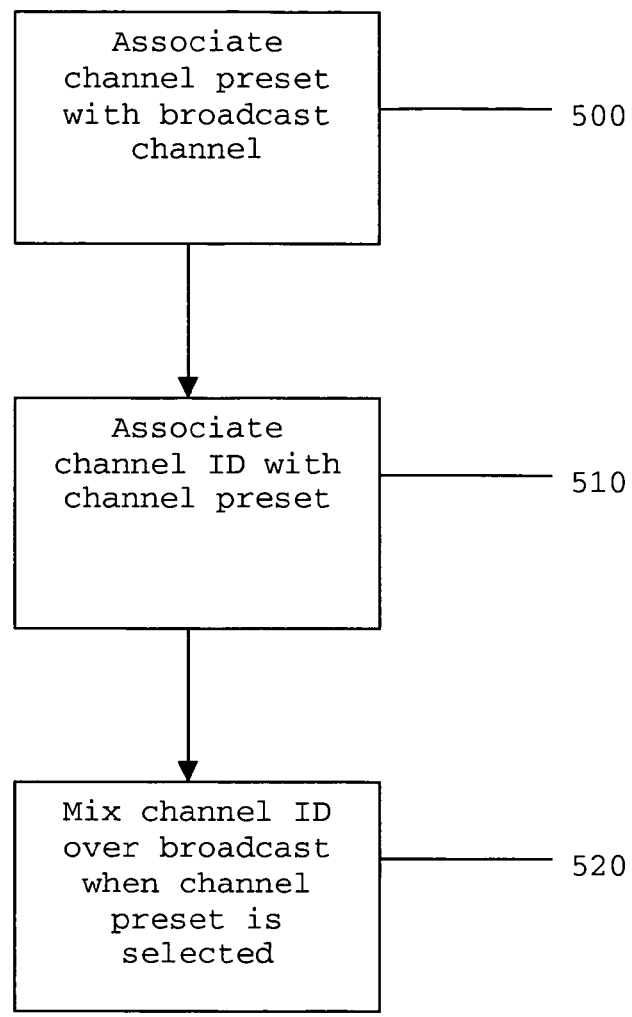
FIG. 5 shows a flow diagram in accordance with a method of an exemplary embodiment.
Figure 6:
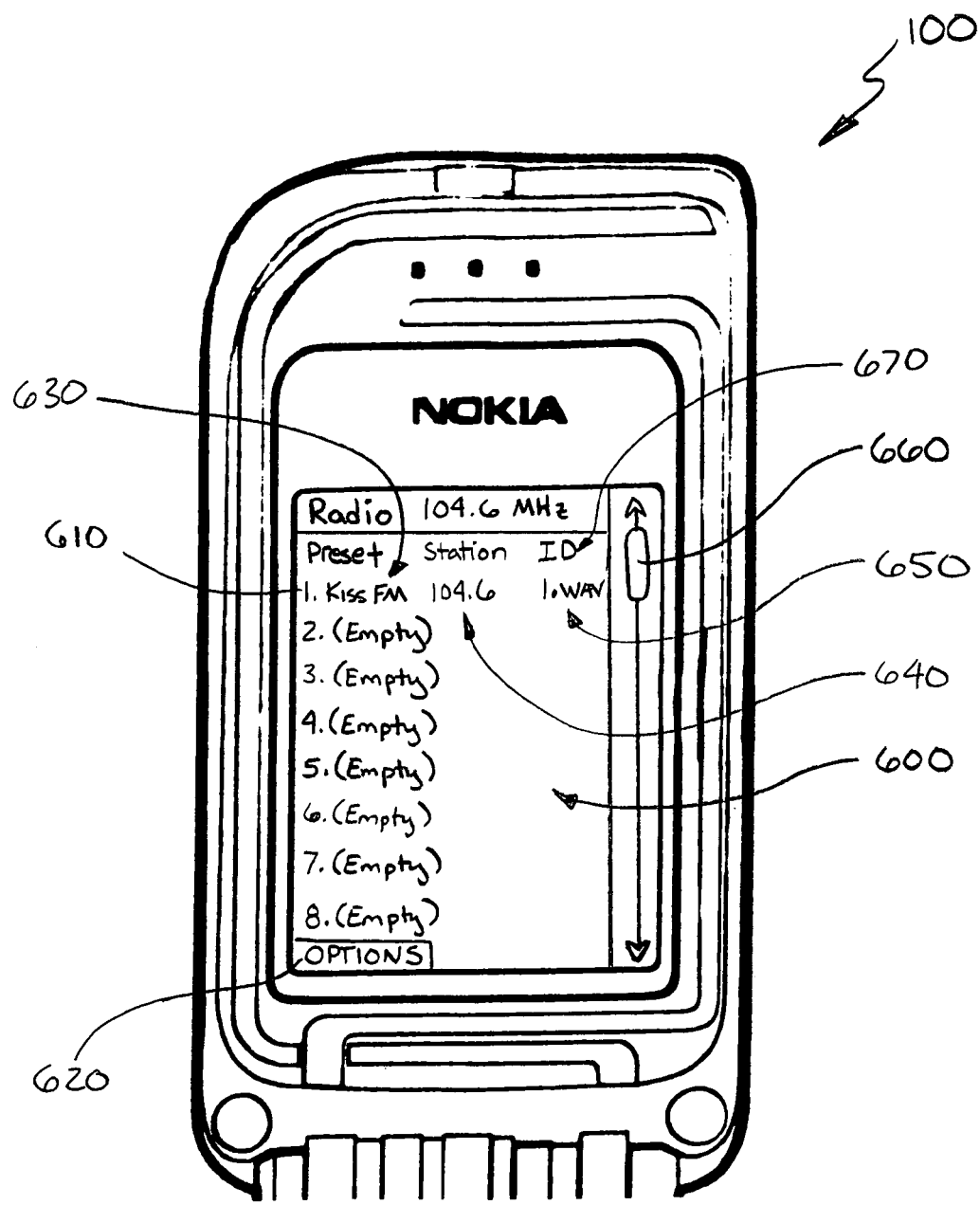
FIGS. 6-8 illustrate exemplary menus in accordance with an exemplary embodiment.
Figure 7:
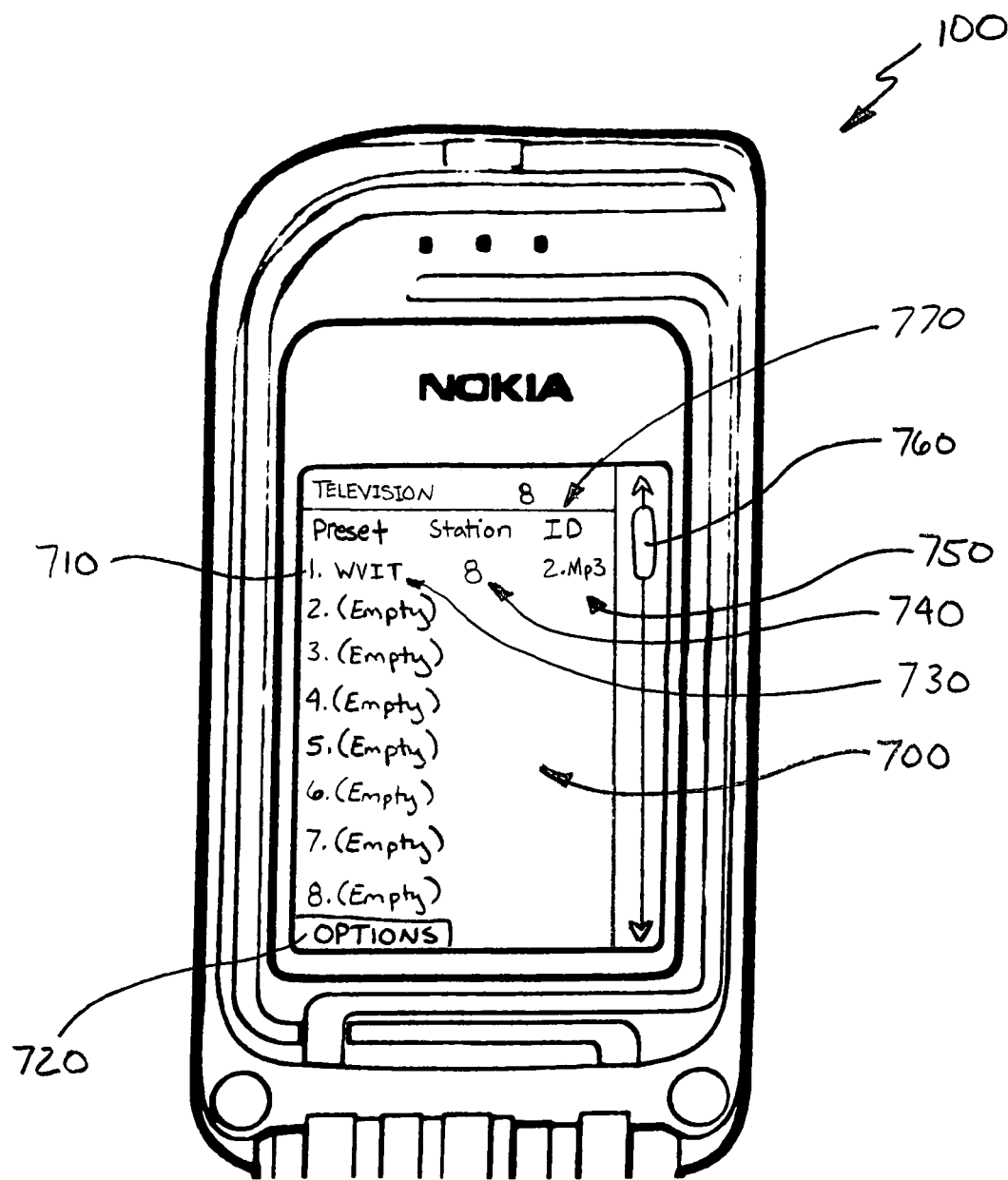

Referring to FIGS. 6 and 7, the mobile device 100 may have internet, radio and television broadcast receiving software algorithms stored in the memory 130 of the mobile device 100. Each of the internet, radio and television software programs or features may have any suitable number of definable memory locations that may allow a user to access any suitable broadcast channel such as, for example, radio, television or internet broadcast channels that are available to the user. The memory locations may be accessible through any suitable input selection key of the mobile device 100, such as, a dedicated function key, a hot key, a multifunction key, a hard and/or soft key or a user definable key. The user may associate the memory locations to correspond to certain internet, radio or television broadcast channels such as, for example, the internet, radio or television channels listened to most frequently by the user (FIG. 5, Block 500). In alternate embodiments, a user may access the memory locations by scrolling through and activating/selecting menu items of the mobile device 100. The menu items may be any suitable items such as, for example, numbers, letters or symbols. These selection items (e.g. the keys or menu items) associated with the memory locations for identifying an internet, radio or television channel may allow a user to directly access an internet, radio or television channel without scanning or scrolling through, for example, each and every internet, radio or television broadcast channel/frequency available to be received by the mobile device 100. These keys and menu items associated with the radio, television or internet broadcasts are referred to herein as channel presets.

In one example, there may be a set of channel presets for each of the internet, radio and television broadcast receiving software such as, for example set 800 for the internet broadcast channels, set 600 for the radio channels and set 700 for the television channels. The sets of channel presets may be switchably selected by a user using, for example, the input unit 120 and/or display 110 when each of the internet, radio or television features of the mobile device 100 are selected. For example, when the user activates the radio broadcast feature of the mobile device 100 the channel presets are automatically switched to correspond to the radio channel presets. When the user selects the television broadcast feature the channel presets are automatically switched to correspond to the television channel presets and when the user selects the internet broadcast feature the channel presets are automatically switched to correspond to the internet broadcast channel presets. Where the sets of channel presets are selectable depending on the active function of the mobile device 100 (e.g. internet, radio or television broadcast reception), the channel preset keys for the radio, television and internet presets may overlap. For example, in the radio broadcast receiving software, the user may define channel preset number one 610 to correspond to FM radio channel frequency 104.6, in the television broadcast receiving software the user may define channel preset number one 710 to correspond to television channel eight and in the internet broadcast receiving software the user may define channel preset number one 810 to correspond to internet broadcast channel for news information.

In alternate embodiments, there may be one set of channel presets for both the, internet radio and television broadcast receiving software. For example, in the radio broadcast receiving software, the user may define channel preset number one to correspond to FM radio channel frequency 104.6, channel preset number two to correspond to FM radio channel frequency 99.1. In the television broadcast receiving software the user may define channel preset number three to correspond to television channel eight while in the internet broadcast receiving software the user may define channel preset number four to correspond to the internet channel for news information. Where there is one set of channel presets, the channel preset numbers do not overlap. Although the term "channel preset number" is used, the channel presets may be identified in any suitable manner such as by symbols, letters, etc.

Figure 8:
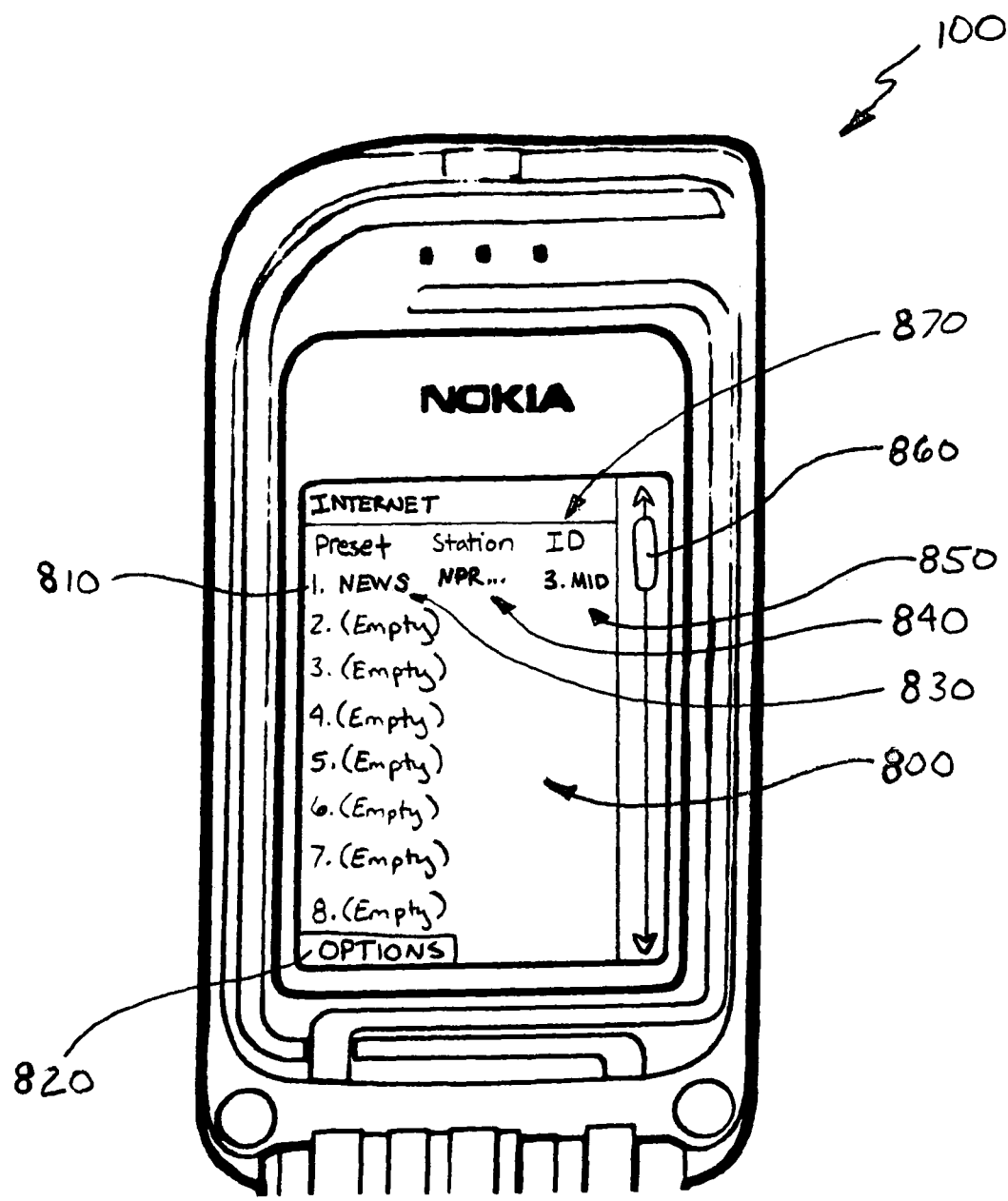

The channel presets may be defined and associated with a selection item such as a key or menu item of the mobile device 100 through, for example, a settings or options menu 620, 720 of the device 100. There may be separate settings menus for the radio broadcast receiving software, the television broadcast receiving software and the internet broadcast receiving software. In alternate embodiments, the setting menus may be combined where the user specifies the type of broadcast each of the channel presets are to be associated with. In other alternate embodiments, any suitable settings menu or method for defining the channel presets may be utilized. Referring to FIGS. 6-8, the user may select menu item number one (i.e. preset channel location number one) 610, 710, 810 with, for example, a scroll key, stylus, or any other suitable pointing device such as scroll key 280 or stylus 330. Through the settings or option menu 620, 720, 820 the user may assign a name to the channel preset. For example, in the radio function preset number one 610 may be assigned the name 630 "KISS FM", in the television function the name 730 "WVIT" may be assigned to preset number one 710 and in the internet broadcast function the name 830 "NEWS" may be assigned to preset number one 810. In the options menu 610, 720, 820 the user may also assign or associate the radio 640, television 740 or internet 840 broadcast stations to the presets as shown in FIGS. 6-8.

In one example, any suitable keys may be utilized to access the channel presets such as for example, the keys of keypad 320 on the PDA 300. These channel presets may be accessed or selected directly through a corresponding key on the input unit 120, through a stylus acting on a touch screen or by any suitable menu such as those shown in FIGS. 6 and 7. For example, the channel presets may correspond to any suitable keys of the input unit 120. Referring to FIG. 2, depending on whether the user is using, for example, the internet, radio or television feature of the mobile device 100, preset channel one 610, 710, 810 may correspond to the "number one" key 220A on the keypad 220 of the mobile device 200, while preset channel button two corresponds to the "number two" key 220B on the keypad 220 and so on. In another example, the presets may be scrolled through using any suitable keys on the device 100, such as scroll key 280 or a peripheral device, such as a headset control, connected to the device 100. Where the device is equipped with a touch screen a user may scroll through the presets using scroll bar 660, 760, 860.

Scrolling through the channel presets may be substantially similar to scrolling through the names and numbers of an address or phone book stored in a mobile device. For example, in alternate embodiments the channel presets may be scrolled through and selected by activating a single key on the device. For example, the single key may be a multifunction key so that pressing, for example, the top or bottom of the multifunction key may scroll through the broadcast stations. The multifunction key may be activated or pressed repeatedly or held down by the user to scroll through and highlight the stations. The stations may be activated by, for example, pressing the center of the multifunction key. In alternate embodiments, a station may be selected by, for example, stopping on or highlighting a particular station where after a predetermined amount of time the station is automatically selected by the device 100 or the user may activate or hold down the multifunction key after the station is highlighted. In other alternate embodiments, a separate selection key may be used in conjunction with the multifunction key for activating or selecting a broadcast station. In still other alternate embodiments, the channel presets may be accessed or selected in any suitable manner such as, for example, by a scroll knob or by voice recognition.

In operation, the user of the mobile device 100 may be listening to an internet, radio or television broadcast using a headset connected to connectivity port 116 or through a speaker of the device 100 such as speaker 115. The user may change or scroll through internet, radio or television channels via suitable controls located on a cord of the headset or by a suitable key of the input unit 120. The key may be, for example, a dedicated channel selection key, a channel preset key as described above or a soft key of the input unit 120. While switching channels, the user may not be able to look at the display 110 of the device 100 so that an accident or collision may be avoided such as when, for example, the user is walking in a crowded area or riding a bicycle. In other situations, the device 100 may be in a location where the user cannot see the display 100 of the device such as when the device 100 is the users purse or pocket.

In accordance with an exemplary embodiment, when a user defines the channel presets, a user may also associate or define a link to channel identifiers 670, 770, 870 corresponding to each of the channel presets (FIG. 5, Block 510). The channel identifier 670, 770, 870 may be, for example, a sound or tune file, such as files 650, 750, 850 indicated in FIGS. 6-8 that identifies or alerts the user as to which broadcast station the user is listening to. For example, the file 650 may be a sound recording that audibly announces the call sign of the radio broadcast channel (e.g. "Kiss FM"). These sound or tune files 650, 750, 850 may be stored in the memory 130 of the device 100. The channel identifier may be any suitable sound recording or file such as, for example, a digital mp3 (.mp3), wave (.wav), real audio (.ram) or midi (.mid) file or a digital recording made in any suitable format from an analog signal such as, for example, an AM/FM radio signal. The recording may be created by the user and may be, for example, a voice recording of the station call sign, channel or frequency number or recorded from a radio or television broadcast through the device's microphone 117. In alternate embodiments, the channel identifier may be a tune or sound downloaded from the internet such as, for example, from the radio or television channel's website into the memory 130 of the mobile device 100. In other alternate embodiments, the channel identifiers may be files downloaded or transferred into the mobile device 100 from other devices such as other mobile devices via any suitable communication connection such as, for example, a bluetooth connection. The sound or tune may also be a sound or tune preinstalled in the mobile device 100 during its manufacture. In other alternate embodiments, any suitable sound or tune may be utilized as the channel identifier.

The device 100 may be configured to allow a user to configure the channel identifier such as through, for example, a suitable settings menu. For example, the user may be able to turn the channel identification on and off, adjust the volume at which the identifier is played or specify whether the channel identifier is to be played over the received broadcast or if the broadcast is to be suspended or muted when the identifier is played. In alternate embodiments, the channel identifier may be adjusted or configured in any suitable manner.

The control unit 140 of the device 100 may cause the channel identifier 650, 750 to be played automatically when its corresponding channel preset is selected so that it is mixed on top of the broadcast audio (FIG. 5, Block 520). For example, when the user selects channel preset number one 610 in the radio feature of the mobile device 100 the controller automatically causes the identifier 650 to play on top of the radio broadcast. In alternate embodiments, the broadcast audio may be suspended (e.g. muted) while the channel identifier is played. In still other alternate embodiments the channel identifier may be presented to the user in any suitable manner. This allows the user to perceive aurally what channel the user has switched to and may enable a user to change or scroll through the preset radio or television channels without looking at a display 110.

Figure 4:
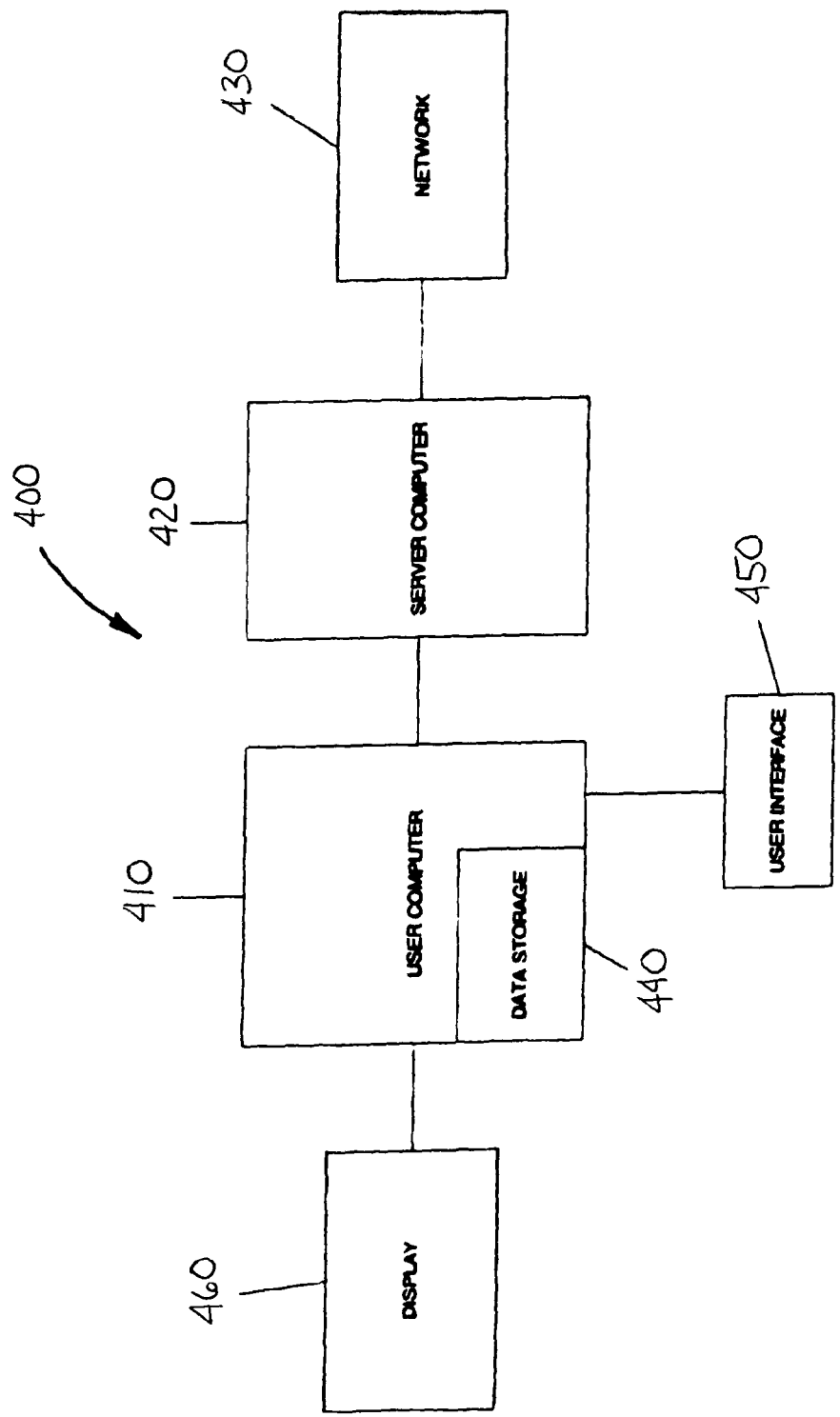
FIG. 4 is a block diagram of an exemplary apparatus incorporating features of an exemplary embodiment.

The exemplary embodiments may also include software and computer programs incorporating the process steps and instructions described above that are executed in different computers. FIG. 4 is a block diagram of an exemplary apparatus 400 incorporating features of an exemplary embodiment that may be used to practice the exemplary embodiment. As shown, a computer system 410 may be linked to another computer system 420, such that the computers 410 and 420 are capable of sending information to each other and receiving information from each other. In one embodiment, computer system 420 could include a server computer adapted to communicate with a network 430 for receiving, for example, internet, television or radio broadcasts. The server computer may be a gateway for allowing any connected device, such as another computer, television, radio or mobile device to receive information from the network 430. Computer systems 410 and 420 can be linked together in any conventional manner including, for example, a modem, hard wire connection, wireless connection, or fiber optic link. Generally, information can be made available to both computer systems 410 and 420 using a communication protocol typically sent over a communication channel or through a dial-up connection on ISDN line. Computers 410 and 420 are generally adapted to utilize program storage devices embodying machine readable program source code which is adapted to cause the computers 410 and 420 to perform the method steps of the exemplary embodiments. The program storage devices incorporating features of the exemplary embodiments may be devised, made and used as a component of a machine utilizing optics, magnetic properties and/or electronics to perform the procedures and methods of the exemplary embodiments. In alternate embodiments, the program storage devices may include magnetic media such as a diskette or computer hard drive, which is readable and executable by a computer. In other alternate embodiments, the program storage devices could include optical disks, read-only-memory ("ROM"), floppy disks and semiconductor materials and chips (e.g. flash memory, EEPROM, EPROM, etc).

Computer systems 410 and 420 may also include a microprocessor for executing stored programs. Computer 410 may include a data storage device 440 on its program storage device for the storage of information and data. The computer program or software incorporating the processes and method steps incorporating features of the exemplary embodiments may be stored in one or more computers 410 and 420 on an otherwise conventional program storage device. In one embodiment, computers 410 and 420 may include a user interface 450, and a display interface 460 from which features of the exemplary embodiments can be accessed. The user interface 450 and the display interface 460 can be adapted to allow the input of queries and commands to the system, as well as present the results of the commands and queries.

The disclosed exemplary embodiments may allow a user of, for example, a mobile device to define a channel identifier corresponding to a channel preset of the mobile device. This may allow the user to switch, for example, radio or television channels without having to look at the mobile device to determine which radio or television channel has been selected.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

The invention claimed is:

1. An apparatus comprising:
a memory;
a processor coupled to the memory; and
a key configured to receive user input, the user input activating the key to indicate selection of a broadcast channel preset, the broadcast channel preset defining a corresponding broadcast channel;
wherein the processor is operable to:
associate a sound file with the broadcast channel preset, wherein the sound file is separate from information received by the broadcast channel corresponding to the broadcast channel preset, and wherein the sound file is, prior to being played back in response to selection of the broadcast channel preset, stored locally in the memory of the apparatus; and
to cause the playback of the sound file at a time the key is activated to select the broadcast channel corresponding to the broadcast channel preset, wherein the sound file contains audio information identifying the broadcast channel corresponding to the broadcast channel preset and the playback of the sound file provides an audible notification conveying to a user of the apparatus the identity of the broadcast channel corresponding to the broadcast channel preset.

2. The apparatus of claim 1, wherein the apparatus comprises a mobile telecommunication device.

3. The apparatus of claim 1, wherein the key is configured to select a radio broadcast channel when activated.

4. The apparatus of claim 1, wherein the key is configured to select a television broadcast channel when activated.

5. The apparatus of claim 1, wherein the key is configured to select an internet broadcast channel when activated.

6. The apparatus of claim 1 wherein the processor is configured to mix the sound file with an audio broadcast received by the apparatus.

7. The apparatus of claim 1 wherein the processor is further operable to mute an audio broadcast received by the apparatus when the file is played.

8. The apparatus of claim 1, wherein the sound file comprises a recording from a radio or television broadcast.

9. The apparatus of claim 1, wherein the sound file comprises a file downloaded from the internet or received from another device via a wireless or wired connection.

10. The apparatus of claim 1, wherein the sound file is locally stored in the memory of the apparatus by the user prior to being played back in response to selection of the broadcast channel preset, and wherein the audible notification conveying the identity of broadcast channel corresponding to the broadcast channel preset is based fully on the audio information contained in the sound file stored locally in the memory of the apparatus.

11. A method comprising:
associating a channel preset of a device with a broadcast station that can be received by the device;
associating a selected sound file with the channel preset wherein the selected file is separate from information received from the broadcast station corresponding to the channel preset, and wherein the selected sound file, prior to being played in response to selection of the channel preset, is stored locally on the device;
receiving user input indicating a selection of the channel preset to activate the broadcast station; and
modifying the broadcast received from the broadcast station on the channel while playing the associated selected sound file, the associated selected sound file containing audio information identifying a selected broadcast station corresponding to the channel preset, and wherein playing of the associated selected sound file provides an audible notification conveying to a user of the device the identity of the broadcast station corresponding to the channel preset.

12. The method of claim 11, wherein modifying the broadcast received from the broadcast station comprises muting the broadcast received from the broadcast station.

13. The method of claim 11, wherein modifying the broadcast received from the broadcast station comprises mixing the broadcast received from the broadcast station with the file.

14. The method of claim 11, wherein the broadcast station is a radio broadcast station.

15. The method of claim 11, wherein the broadcast station is a television broadcast station.

16. The method of claim 11, wherein the broadcast station is an internet based broadcast.

17. The method of claim 11, wherein the associated selected file is played over an audio broadcast received by the broadcast reception channel.

18. The method of claim 11, wherein the sound file is recorded from a radio or television broadcast.

19. The method of claim 11, wherein the sound file is downloaded from the internet.

20. The method of claim 11, wherein the sound file is locally stored in the device by the user prior to being played in response to selection of the channel preset, and wherein the audible notification conveying the identity of broadcast station corresponding to the channel preset is based fully on the audio information contained in the sound file stored locally on the device.

* * * * *